United States Patent
Kalkunte et al.

(10) Patent No.: US 6,950,430 B2
(45) Date of Patent: *Sep. 27, 2005

(54) SWITCH FABRIC WITH PATH REDUNDANCY

(75) Inventors: Mohan Kalkunte, Sunnyvale, CA (US); Srinivas Sampath, Sunnyvale, CA (US); Daniel Tai, Sunnyvale, CA (US); Soma Pullela, San Jose, CA (US); Kevin Cameron, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 331 days.

This patent is subject to a terminal disclaimer.

(21) Appl. No.: 10/288,417

(22) Filed: Nov. 6, 2002

(65) Prior Publication Data

US 2003/0118016 A1 Jun. 26, 2003

Related U.S. Application Data

(63) Continuation of application No. 09/883,212, filed on Jun. 19, 2001, now Pat. No. 6,535,510.
(60) Provisional application No. 60/229,305, filed on Sep. 1, 2000, and provisional application No. 60/212,592, filed on Jun. 19, 2000.

(51) Int. Cl.[7] .............................................. H04L 12/56
(52) U.S. Cl. ....................................... 370/389; 370/428
(58) Field of Search ............................... 370/360, 428, 370/389, 401, 327, 340, 386

(56) References Cited

U.S. PATENT DOCUMENTS

| 5,278,789 A | 1/1994 | Inoue et al. |
| 5,390,173 A | 2/1995 | Spinney et al. |
| 5,414,704 A | 5/1995 | Spinney |

(Continued)

FOREIGN PATENT DOCUMENTS

| CA | 2227655 | 10/1999 |
| EP | 0 256 702 A2 | 2/1988 |

(Continued)

OTHER PUBLICATIONS

Murakami, Gary et al., "Pulsar: Non–Blocking Packet Switching with Shift–Register Rings", Computer Communication Review, No. 4, Sep. 20, 1990, pp. 145–155.

(Continued)

*Primary Examiner*—Kenneth Vanderpuye
(74) *Attorney, Agent, or Firm*—Squire, Sanders & Dempsey L.L.P.

(57) ABSTRACT

A method of forwarding data in a network switch fabric is disclosed. An incoming data packet is received at a first port of the fabric and a first packet portion, less than a full packet length, is read to determine particular packet information, the particular packet information including a source address and a destination address. An egress port bitmap is determined based on a lookup in a forwarding table and it is determined if the destination address belongs to a trunk group of trunked ports. The incoming data packet is forwarded based on the egress port bitmap, when the destination address does not belong to the trunk group. When the destination address does belong to the trunk group, a particular trunked port of the trunk group is determined and the incoming data packet is forwarded thereto. More specifically, the particular trunked port of the trunk group may be determined by calculating a hash value based on the source address and the destination value and selecting the particular trunked port based on the hash value. Additionally, a class of service for the incoming data packet is also determined from the particular packet information and a priority for forwarding is set based on the class of service.

12 Claims, 11 Drawing Sheets

U.S. PATENT DOCUMENTS

| | | | |
|---|---|---|---|
| 5,423,015 A | 6/1995 | Chung | |
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,555,398 A | 9/1996 | Raman | |
| 5,568,477 A | 10/1996 | Galand et al. | |
| 5,579,301 A | 11/1996 | Ganson et al. | |
| 5,602,850 A | 2/1997 | Wilkinson et al. | |
| 5,644,784 A | 7/1997 | Peek | |
| 5,652,579 A | 7/1997 | Yamada et al. | |
| 5,696,899 A | 12/1997 | Kalwitz | |
| 5,742,613 A | 4/1998 | MacDonald | |
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,940,596 A | 8/1999 | Rajan et al. | |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,119,196 A | 9/2000 | Muller et al. | |
| 6,122,275 A * | 9/2000 | Karol et al. | 370/389 |
| 6,151,297 A * | 11/2000 | Congdon et al. | 370/216 |
| 6,175,902 B1 | 1/2001 | Runaldue et al. | |
| 6,185,185 B1 | 2/2001 | Bass et al. | |
| 6,310,875 B1 * | 10/2001 | Nichols et al. | 370/388 |

FOREIGN PATENT DOCUMENTS

| | | |
|---|---|---|
| EP | 0312917 A2 | 4/1989 |
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"A High–Speed CMOS Circuit for 1.2–Gb/s 16 × 16 ATM Switching," Alain Chemarin et al. 8107 IEEE Journal of Solid–State Circuits 27 Jul. 1992, No. 7, New York, US, pp. 1116–1120.

"Local Area Network Switch Frame Lookup Technique for Increased Speed and Flexibility," 700 IBM Technical Disclosure Bulletin 38 Jul. 1995 No. 7, Armonk, NY, US, pp. 221–222.

"Queue Management for Shared Buffer and Shared Multi--buffer ATM Switches," Yu–Sheng Lin et al., Department of Electronics Engineering & Institute of Electronics, National Chiao Tung University, Hsinchu, Taiwan, R.O.C., Mar. 24, 1996, pp. 688–695.

"A 622–Mb/s 8 × 8 ATM Switch Chip Set with Shared Multibuffer Architecture," Harufusa Kondoh et al., 8107 IEEE Journal of Solid–State Circuits 28 1993Jul., No. 7, New York, US, pp. 808–814.

"Catalyst 8500 CSR Architecture," White Paper XP–002151999, Cisco Systems Inc. 1998, pp. 1–19.

"Computer Networks," A.S. Tanenbaum, Prentice–Hall Int., USA, XP–002147300(1998), Sec. 5.2–Sec. 5.3, pp. 309–320.

* cited by examiner

SWITCH FABRIC WITH PATH REDUNDANCY

REFERENCE TO RELATED APPLICATIONS

This is a Continuation Division Continuation-in-Part of application Ser. No. 09/883,212 filed Jun. 19, 2001, now U.S. Pat. No. 6,535,810. The disclosure of the prior application is hereby incorporated by reference herein in its entirety.

This application claims priority of U.S. Provisional Patent Application Ser. No. 60/212,592, filed on Jun. 19, 2000 and U.S. Provisional Patent Application Ser. No. 60/229,305, filed on Sep. 1, 2000. The contents of the provisional applications are hereby incorporated by reference.

BACKGROUND OF THE INVENTION

1. Field of the Invention

The invention relates to an apparatus for high performance switching in local area communications networks such as token ring, ATM, ethernet, fast ethernet, and 1 gigabit and 10,000 Mbits/s ethernet environments, generally known as LANs. In particular, the invention relates to a new switching architecture in an integrated, modular, single chip solution, which can be implemented on a semiconductor substrate such as a silicon chip and a switching fabric that allows for rapid communication between the switches.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

Basic ethernet wirespeed is up to 10 megabits per second, and Fast Ethernet is up to 100 megabits per second. The newest ethernet is referred to as 10,000 Mbits/s gigabit ethernet, and is capable of transmitting data over a network at a rate of up to 10,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed.

Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, the means with which the elements communicate with each other can limit the operational speed of the switch if elements are made to wait for those communications.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

In addition, the switch fabric also plays an important part in the operational speeds of a network. Used with network switches, the fabric allows for the building of switching units with scalable port densities. The fabric receives switched data from network switches and needs to forward differing types of data (i.e. multicast, unicast, broadcast, etc.) to other connected network switches. However, prior art switch fabrics do not provide the needed throughput and can limit the total processing abilities of connected network switches.

SUMMARY OF THE INVENTION

The present invention is directed to a switch-on-chip solution for a self-routing fabric, capable of using ethernet, fast ethernet, and 1 gigabit and 10,000 Mbits/s ethernet systems, wherein all of the hardware is disposed on a single microchip. The present invention is also directed to methods employed to achieve the desired processing and forwarding of data. The present invention is configured to maximize the ability of packet-forwarding at linespeed, and to also provide a modular configuration wherein a plurality of separate modules are configured on a common chip, and wherein individual design changes to particular modules do not affect the relationship of that particular module to other modules in the system.

The present invention is directed to a method of forwarding data in a network switch fabric. An incoming data packet is received at a first port of the fabric and a first packet portion, less than a full packet length, is read to determine particular packet information, the particular packet information including a source address and a destination address. An egress port bitmap is determined based on a lookup in a forwarding table and it is determined if the destination address belongs to a trunk group of trunked ports. The incoming data packet is forwarded based on the egress port bitmap, when the destination address does not belong to the trunk group. When the destination address does belong to the trunk group, a particular trunked port of the trunk group is determined and the incoming data packet is forwarded thereto. More specifically, the particular trunked port of the trunk group may be determined by calculating a hash value based on the source address and the destination value and selecting the particular trunked port based on the hash value. Additionally, a class of service for the incoming data packet is also determined from the particular packet information and a priority for forwarding is set based on the class of service.

The present invention is also directed to another method of forwarding data in a network switch fabric, in an another embodiment. An incoming data packet is received at a first port of the fabric and a first packet portion, less than a full packet length, is read to determine particular packet information, the particular packet information including a source address and a destination address. At least one egress port is determined based on a lookup in a forwarding table and a class of service is determined for the incoming data packet based on the particular packet information. Data from the incoming data packet is assigned to a queue based on the at least one egress port and the class of service. The above steps are repeated for further incoming data packets and data from the incoming data packets is assigned to a series of queues and data packets are sequentially forwarded from each queue of the series of queues.

In addition, the data from the incoming data packet is assigned to a queue after it is packed into cells having a specific cell-length. The method can also include determining if a destination for the incoming data packet is a trunked port, reading from a trunk group table, and deriving the egress port bitmap based on entries in the trunk group table. Also, the particular packet information can include an opcode value that identifies whether the incoming data packet is a unicast packet, a multicast packet, a broadcast packet or resulted in a destination lookup failure.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The present invention is directed to a self-routing fabric with 4/8 10,000 Mbits/s interfaces. The external bandwidth of the fabric according to one embodiment of the present invention is 80/160 Gbps. The present invention allows the building of scalable Gigabit port densities along with other network switching devices.

The present invention provides a single chip solution fabric supporting up to 160 Gbps throughput. The present invention supports 8 ports at 10 Gbps full-duplex and permits forwarding at full wire speed on each port. The fabric also supports eight IEEE 802.1 p priority classes and strict priority and weighted round robin queuing. The fabric of the present invention supports 4096 VLANs for unknown unicasts/Broadcasts and supports IEEE 802.3xFlow Control on each port. The present invention also supports a mechanism to prevent Head of Line (HOL) blocking on a transmit port and supports for trunking and mirroring and redundancy. Lastly, the present invention provides, in one embodiment, a 66 MHz, 32-bit PCIX extension Interface for CPU and other PCI Compliant Devices.

Figure 1:
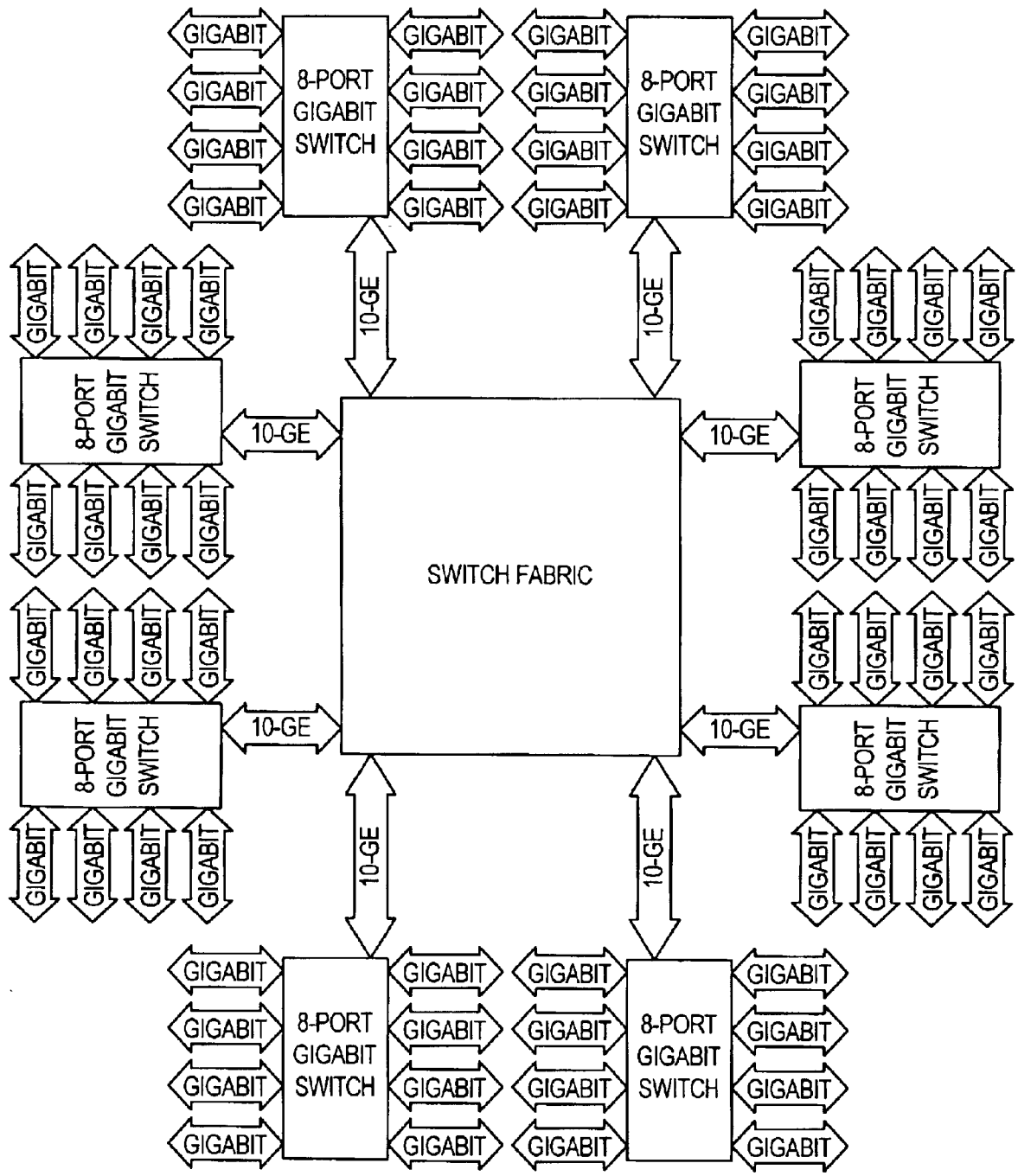
FIG. 1 is a block diagram illustrating an embodiment of the present invention being used with network switches to achieve a 64-port Gigabit solution.
Figure 2:
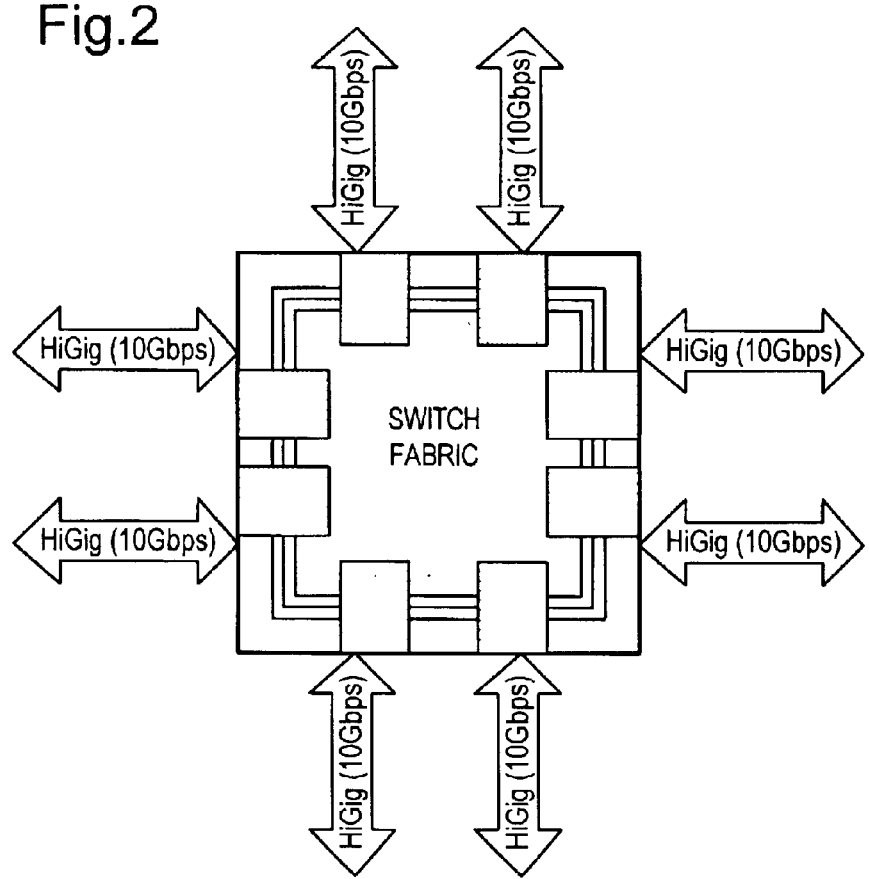
FIG. 2 schematic showing elements of the fabric of the present invention.

FIG. 1 illustrates an example of the fabric of the present invention is a specific application. FIG. 1 illustrates an example of a 64-port Gigabit solution (non-blocking) using the fabric of the present invention and network switches. The general configuration of the fabric of the present invention is illustrated in FIG. 2. A preferred embodiment of the fabric has eight port interfaces with data rates of 10 Gbps and a internal ring allowing the transfer of information and packet data between the port interfaces.

The present invention is a very high-speed fabric, which is simple in terms of logic for frame forwarding decisions. Each packet that enters the fabric must have a Module Header, which contains information for unicast packets about the destination module(s) that a frame needs to be forwarded to. The Module Header is prepended on the egress from the network switch.

In a preferred embodiment, the fabric consists of 8 ports, each of which operate at 10,000 Mbits/s speed. At each port, the module header is examined and the egress port bitmap is determined based on whether the packet is a known unicast, unknown unicast, broadcast multicast, or IP multicast. The above packet types are addressed below.

Unicast Packet

When a frame is received by the fabric ingress, the Opcode value of 1 in the header indicates that the packet is a unicast packet and the egress port and destination module id (DST_MODID) information in the Module Header is valid. The fabric will forward the packet to the egress port in the fabric, which is the path to the destination module. Alternatively, in some configurations there may be more than one path to the destination module in the fabric. Therefore the fabric may have to choose an egress port based on the fabric ingress port and the destination module id. In configurations wherein the destination modules are directly connected to the fabric, the selection of the fabric egress port is based on destination module and is independent of the fabric ingress port.

To support frame forwarding of unicast packet within the fabric in any type of configuration, a simple routing table is provided. The format of this table is as follows:

TABLE 1

| Fields | # Bits | Description |
| --- | --- | --- |
| Destination Port Bitmap | 9 | Port Bitmap Identifies all the egress ports on which the packet should go. |

This Table is 32 deep and when a known unicast packet arrives at the fabric ingress, the DST_MODID from the module header is extracted and looked up in the above table. The resulting bitmap is used to forward to the appropriate ports corresponding to the bit fields.

Broadcast Packet/DLF Forwarding

When a packet arrives at the fabric ingress with Opcode value 2, it indicates that the packet is either a broadcast or unknown (Domain Lookup Failure) unicast. In this event, the VLAN ID is used to indicate all the ports the packet is supposed to be delivered. A table is provided on each port:

TABLE 2

| Fields | # Bits | Description |
| --- | --- | --- |
| Destination Port Bitmap | 9 | Port Bitmap Identifies all the egress ports on which the packet should go. Based on VID |

The table is 4096 entries deep, allowing all values of VLAN classification.

Multicast Packet Forwarding

When a packet arrives at the fabric ingress with Opcode value 3, or 4, it is a Multicast (MC) or IP MC respectively. One table is implemented in order to forward these packets. The index into this table is the combination of the destination port ID (DST_PORTID) and destination module ID (DST_MODID) extracted from the module header.

TABLE 3

| Fields | # Bits | Description |
| --- | --- | --- |
| MC Port Bitmap | 9 | Port Bitmap Identifies all the egress ports on which the packet should go. Based on DST_PORT + DST_MODID |
| IPMC Port Bitmap | 9 | Port Bitmap Identifies all the egress ports on which the packet should go. Based on DST_PORT + DST_MODID |

There are 8 copies of all above tables, or one per port. The configuration of the fabric of the present invention includes an Egress Mask Register (EGRESS_MASK). This register identifies the set of ports that the packet is not allowed to send out from a input port. This register is 9 bits wide and there is one register per port.

Each ingress port has the following blocks: a core for physical transmission (SerDes), a 10,000 Mbits/s Ethernet Full Duplex MAC and an Ingress Logic block that determines the frame forwarding (ING). Each egress port has the following blocks: an Ingress Bus Ring node (IBR); a memory management unit (MMU), and a packet pool RAM.

The present invention also supports many specific features. The fabric supports link aggregation (trunking) of its eight 10 Gbps ports. Up to 4 trunk groups can be supported, each up to maximum of four members. The Trunk Group Table is used to derive the egress port when a packet has to go out on a trunk port. The RTAG is picked up from the Trunk Group Table by the trunk distribution logic to determine the distribution algorithm.

TABLE 4

| Fields | # of Bits | Description |
| --- | --- | --- |
| RTAG | 2 | RTAG identifies the trunk selection criterion for this trunk group. 0 - based on DA + SA hash 1 - full redundancy 2 - reserved 3 - reserved |
| TrunkPortBitMap | 9 | Bit map representing member ports in this trunk group |

There are four copies of the above table, allowing four trunk groups.

The fabric of the present invention also supports dynamic shutting down of ports in the event the link goes down. The fabric interrupts the CPU in such an event. The CPU then is responsible for programming the EPC Link register to disallow packets out of the disabled port. EPC_Link Register is a bit map representing ports that have link valid signal. In addition, mirroring is also supported. The Mirrored-to-Port register indicates the Mirror-to-port in the device and specifies the forwarding of packets deemed to be mirrored. The mirroring information is extracted from the module header. A CPU-to-port register is also supported.

A Priority to COS Queue Mapping Register (COS_SEL) is used to map the incoming packet priority or derived packet priority (after Address Resolution and Filtering Mechanism) to the Egress COS Queue. The Priority to COS Queue Mapping is done after the packet has gone through Address Resolution and Filtering Mechanism, just before sending the packet on the CP Channel. This mapping does not change the Priority field in the Tag Header of the packet, it only decides which COS queue should the packet go out of at the egress port. The need for this register arises due to recommended user priority to traffic class mappings defined in 802.1 p standard.

Additionally, configuration registers are available in the fabric. Each of the following have 8 copies of these registers, i.e. 1 per port. A MODE register is set when all the ports in the fabric will operate in HiGig mode, else the device will operate in low bit-rate mode. Registers are also supported for providing triggers for both high and low watermarks for ingress back pressure flow control. Another register also specifies the priority queuing algorithm, including a strict priority mode, a weighted Round Robin mode and a deficit Round Robin mode. Registers are also provided that store the priority weights for the classes of service and the HOL blocking limit for each.

The following counters are also provided on a per port basis on transmit and receive side. An ingress word count provides the number of words received by the MAC and an egress word count provides the number of words stored in egress on a COS basis. Dropped packet counts are determined for the number of packets dropped by the ingress logic and a HOL dropped packet count provides the number of packets dropped per COS. A count is also maintained with respect to the number of packets dropped due to aging.

In addition, the fabric of the present invention provides Assured Forwarding Support. This feature provides a preferential dropping of packets in the fabric when a particular bit in the module header is set. This bit in the module header is set by the network switch when a certain drop precedence is set. When a packet arrives in fabric MMU, with the bit set, the number of packet pointers for the COS queue associated with the packet is checked against a CNGTHRESHOLD register. If the number of entries in the COS queue for the port exceeds the value in the CNGTHRESHOLD register, the packet is dropped.

Otherwise, the packet is accepted into the COS queue in the MMU. When the packet is dropped, a CNGDROP-COUNT counter is updated. If the particular bit is not set in the module header, all packets are accepted into the COS queue until the COS queue threshold is reached.

Logical Flow on Ingress

Figure 4:
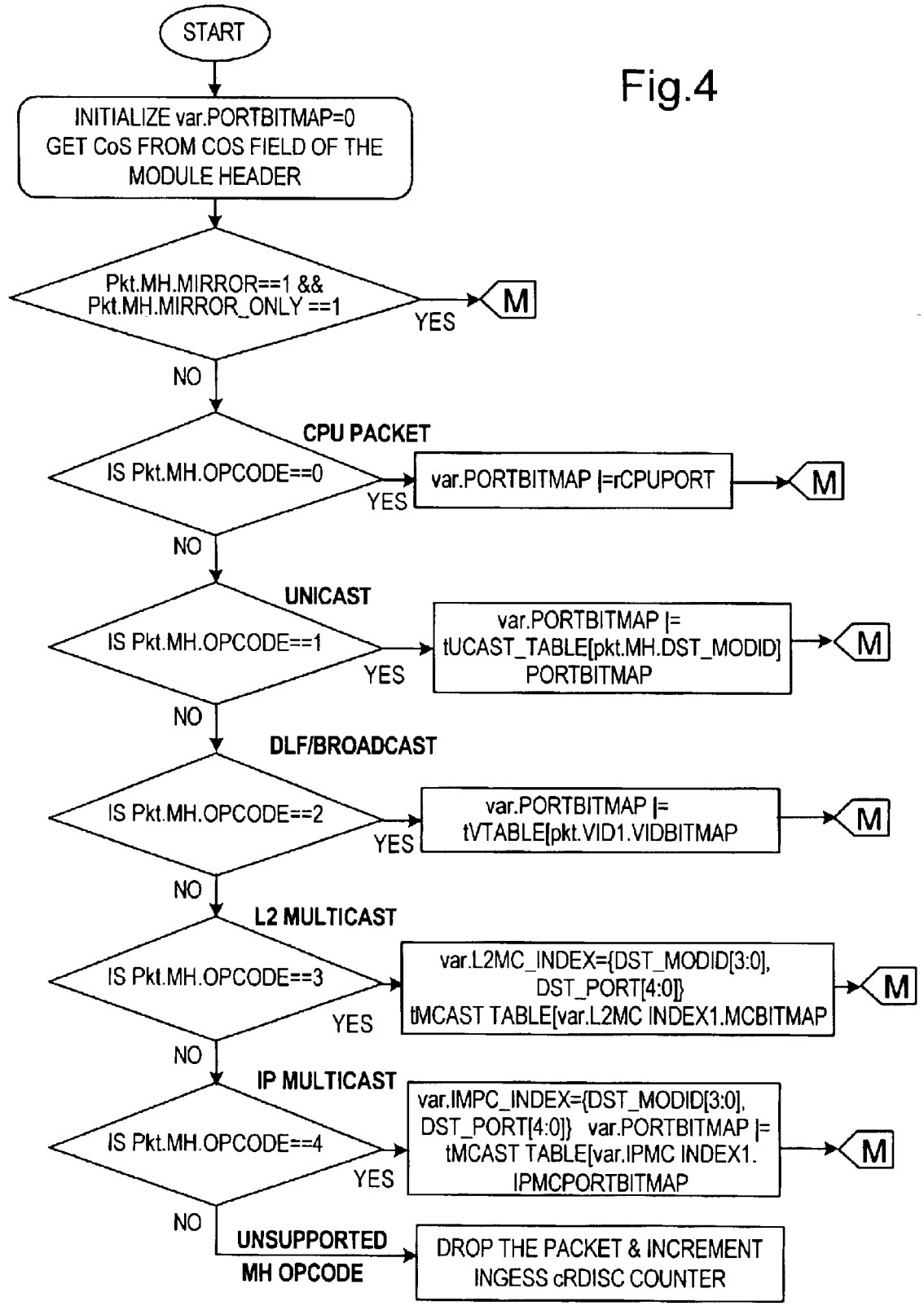
FIG. 4 is a flowchart for the ingress logic for the present invention.

The logical flow on ingress into the fabric will now be discussed. FIG. 4 shows a flowchart providing part of the logic. In the first step, the port bitmap is initialized and the COS is obtained from the module header. An opcode is also read from the module header. If the packet is only being mirrored, then no further evaluation of the header is needed. Otherwise, the type of packet is determined from the opcode, with the port bitmap or other bitmap being set. The types supported include a CPU packet, being sent to the CPU, unicast, broadcast, layer 2 multicast and IP multicast. Once the proper variables are set, the logical flow goes to sub-flowchart M, unless the logic dictates that the packet should be dropped. In the latter case, an ingress counter is incremented.

Figure 5:
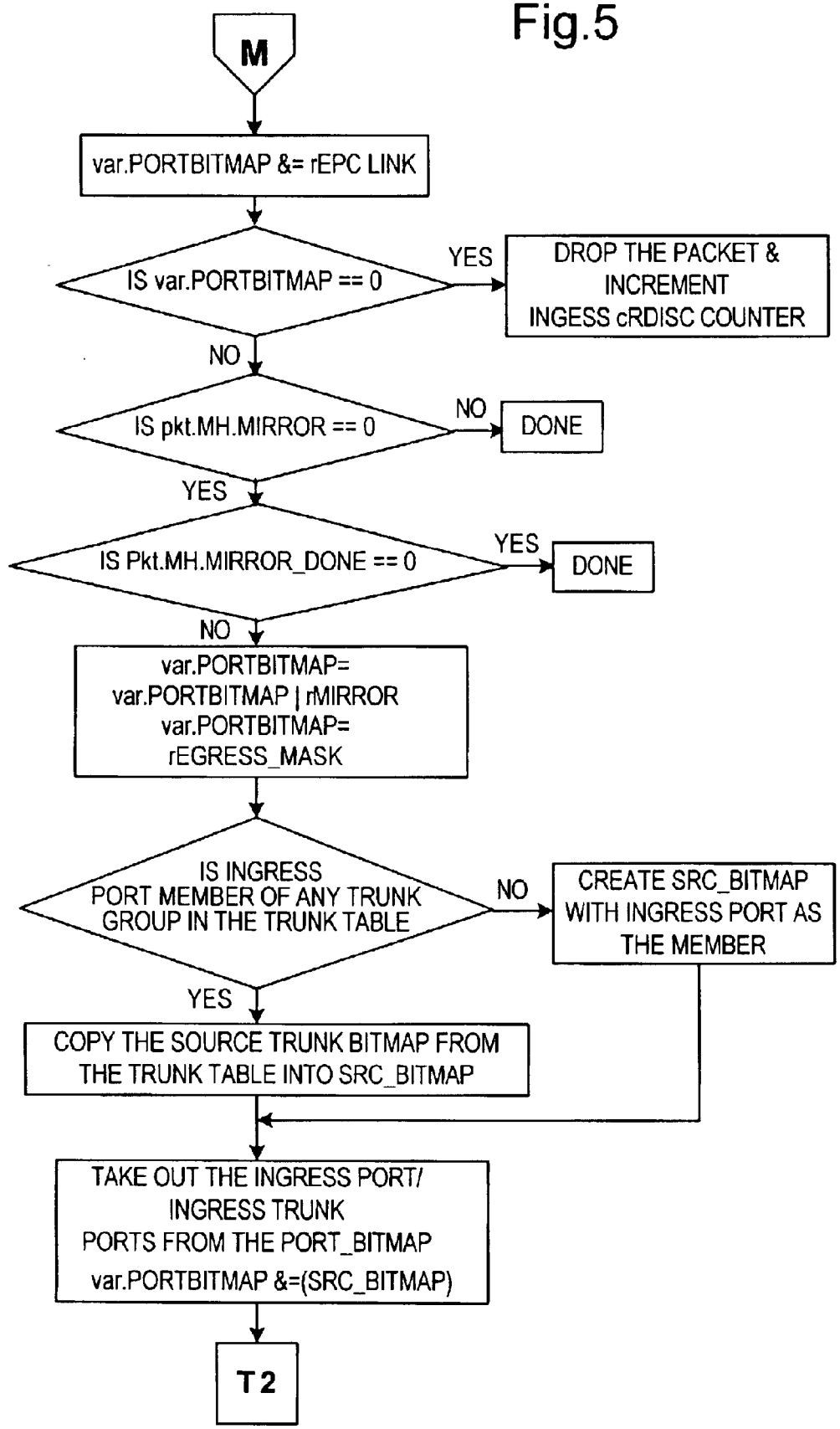
FIG. 5 is a sub-flowchart for the ingress logic for the present invention.
Figure 6:
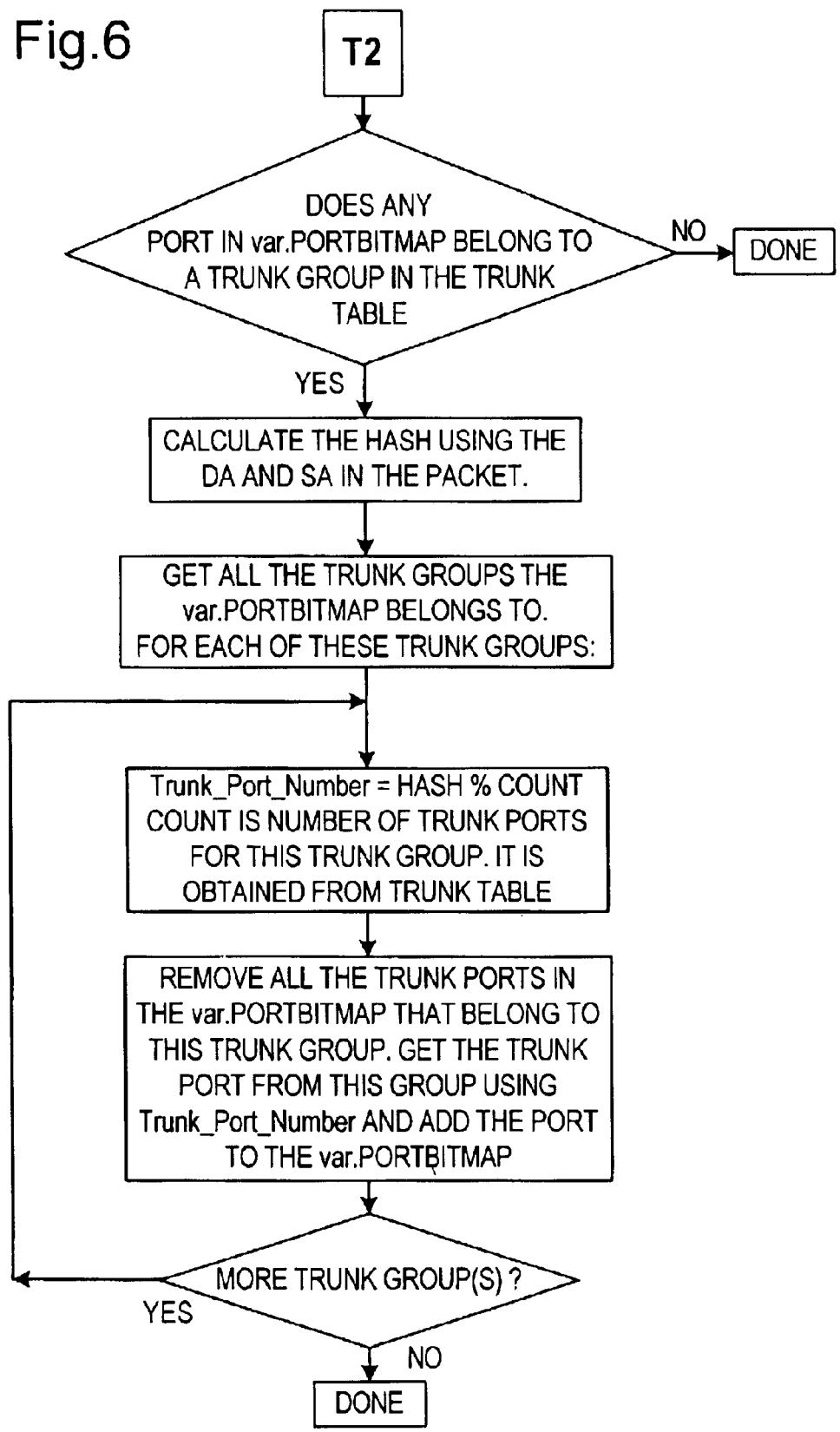
FIG. 6 is a sub-flowchart for the ingress logic for the present invention.

The logical flow continues in M, FIG. 5, where if the packet is only being mirrored, then a register is checked and if the packet has not yet been mirrored, then the mirror-to-port register is set and the port bitmap is set to mirror the packet. Next, if the ingress port is a member of a trunk group, then the port bitmap is set accordingly. The processing of ports in a trunking group is dealt with specifically in FIG. 6.

Figure 7:
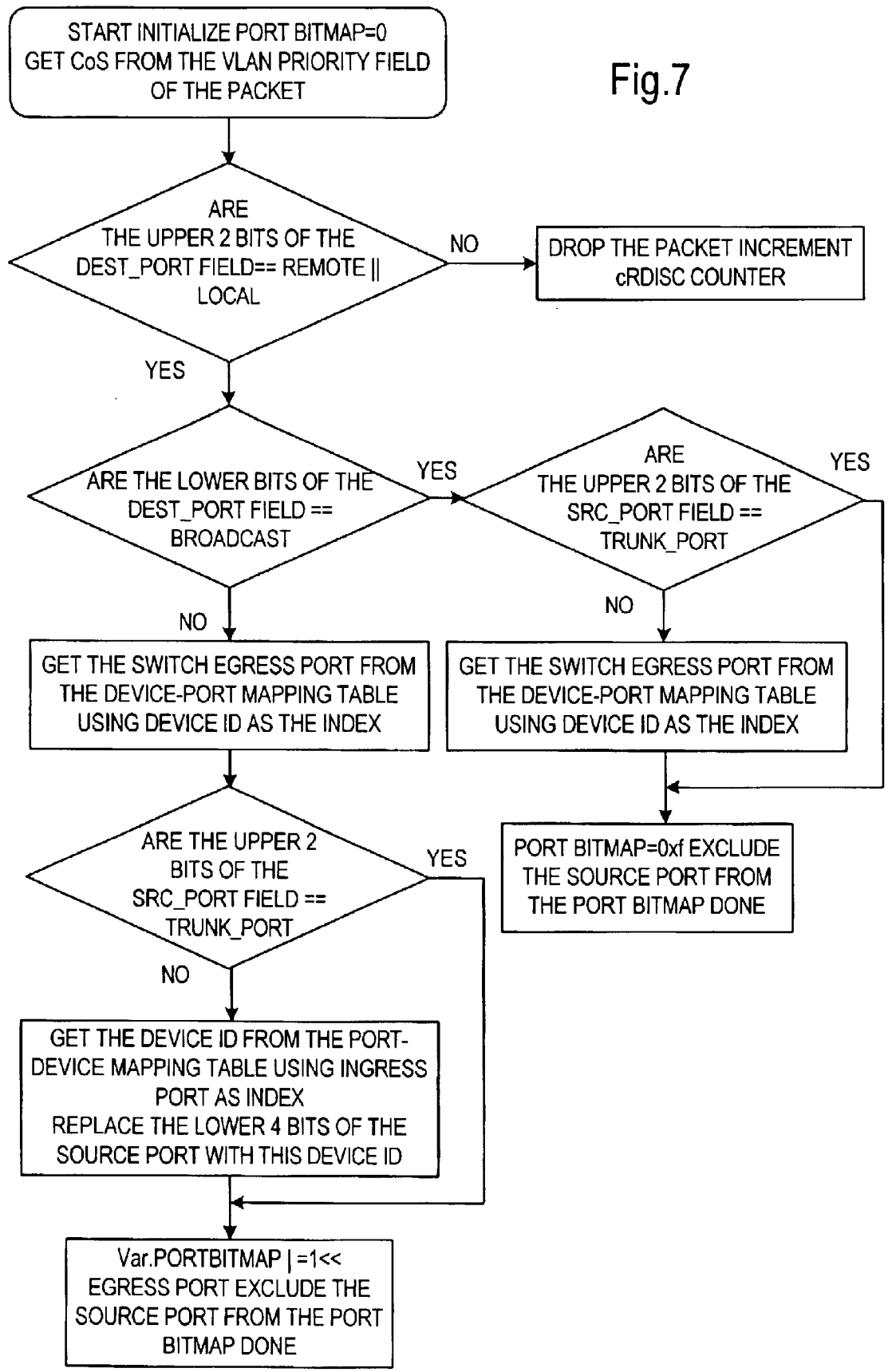
FIG. 7 is another flowchart for the ingress logic for an embodiment of the present invention.

FIG. 7 illustrates a different operating mode for the evaluating packets. The alternate method examines bits of the source and destination ports. In this case, a device-port mapping table is used to determine the switch egress port. It is noted that the operating modes should not be mixed, the later mode sends all broadcast, multicast and unknown unicast to all ports and mirroring is not supported in the later mode.

Memory Management Unit Structure

Next the design and the function of the memory management unit of the fabric of the present invention is discussed in more detail.

The principal functions of the fabric of the present invention can be grouped in several areas. First, having to do with switch fabric bandwidth, the fabric absorbs packet streams from eight ingress ports at an aggregate of maximum 80 Gbps. The fabric allows packets to exit at appropriate egress for unicast and multicast at an aggregate 80 Gbps and accounts for capacity usage by ingress/egress. The fabric effectively manages multicast traffic and processes the additional module header that comes in with each packet. Also, CPU traffic can come from or to any port and has a maximum burst rate of ~2 Gbps.

The fabric also supports 802.1 p Queuing. The fabric prioritizes packets by COS and supports up to 8 queues. The fabric also supports strict priority and fair queuing with weighted allocation by packet count. The fabric also provides for proper flow control and capacity management. When a given ingress exceeds a capacity threshold, the offending ingress port is notified. The MAC should send a PAUSE frame to its link partner to stop the flow of packets. When a given egress exceeds a cell capacity threshold, an HOL (head of line) blocking exists. When a given egress in the HOL state, any packet from any port that is destined for that egress is dropped. When a transaction queue for a given COS for a given egress fills up, it enters an HOL (head of line) blocking state. Any new packets from any port that are destined for that COS/egress pair will be discarded.

Additionally, the following are advanced features, which may be integrated in certain preferred embodiments. The fabric supports fair queuing with weighted allocation by byte count and provides for a memory error recovery scheme.

Ingress Bus Ring

Figure 3:
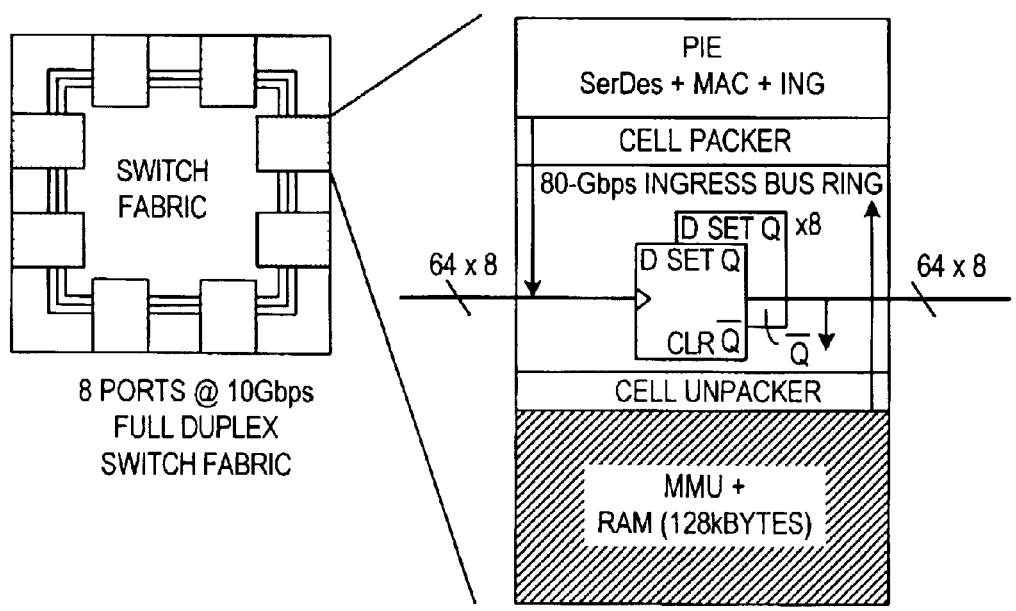
FIG. 3 is schematic showing the internal block structure of one embodiment of the present invention.

The architecture of the fabric includes specific portions that enhance the ability of the fabric to forward packets. A first portion is an Ingress Bus "Ring." For example, the architecture for the MMU can be a distributed fixed capacity scheme where a local copy of RAM (128K bytes) is dedicated to each port. Each port is connected to the neighboring ports via a collection of unidirectional buses, which effectively form a ring connecting all nine (8+CPU) ports. This bus will henceforth be called the Ingress Bus Ring (IBR). The buses are 64 bits wide and there is one bus for each Ingress (hence 64*8=512 bits total). The buses are chained and each originates from the output of a flop of one port and terminates at the input of a flop at its neighboring port. This is illustrated in FIG. 3. This point-to-point scheme addresses many physical design issues present if otherwise a shared global memory with wide (512 bits) data lines. This scheme also makes each port a separate logic entity, which is valuable for testability.

The IBR delivers packet traffic handed off by the Port Ingress-Egress block (PIE) and occurs every clock cycle at 64 bits wide. The data is latched immediately onto the local flops on the bus. And at every clock this word is latched into the flops at the neighboring port(s). The MMU at each port then monitors the word streams on the ring and captures the packet if it determines a destination port match. Destination port information is communicated via a control word that is synchronized with the packet via a side-band bus.

Figure 8:
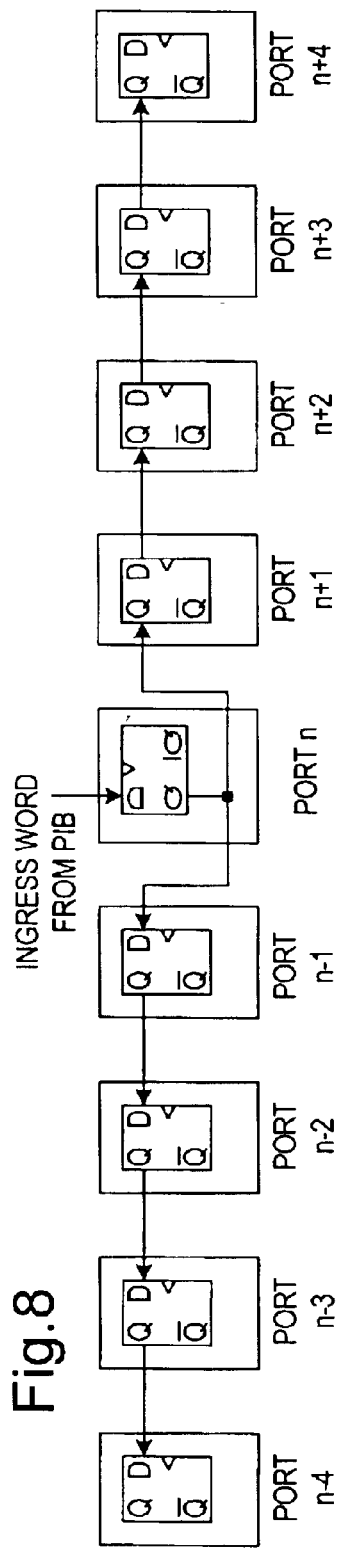
FIG. 8 illustrates the topology of the ingress bus ring.

A power optimization that can be done is to disable the data propagation if no ports down on the ring are recipients of this packet. Also, in one embodiment, each bus channel forwards the word in one direction, which yields a maximum latency of 8 clocks (or 8 hops) to reach the most distant port. This can be improved if the words are forwarded in opposite directions (clock & counter clockwise) so that the maximum hop is down to 4. The following diagram, provided in FIG. 8, is true for any port.

Figure 9:
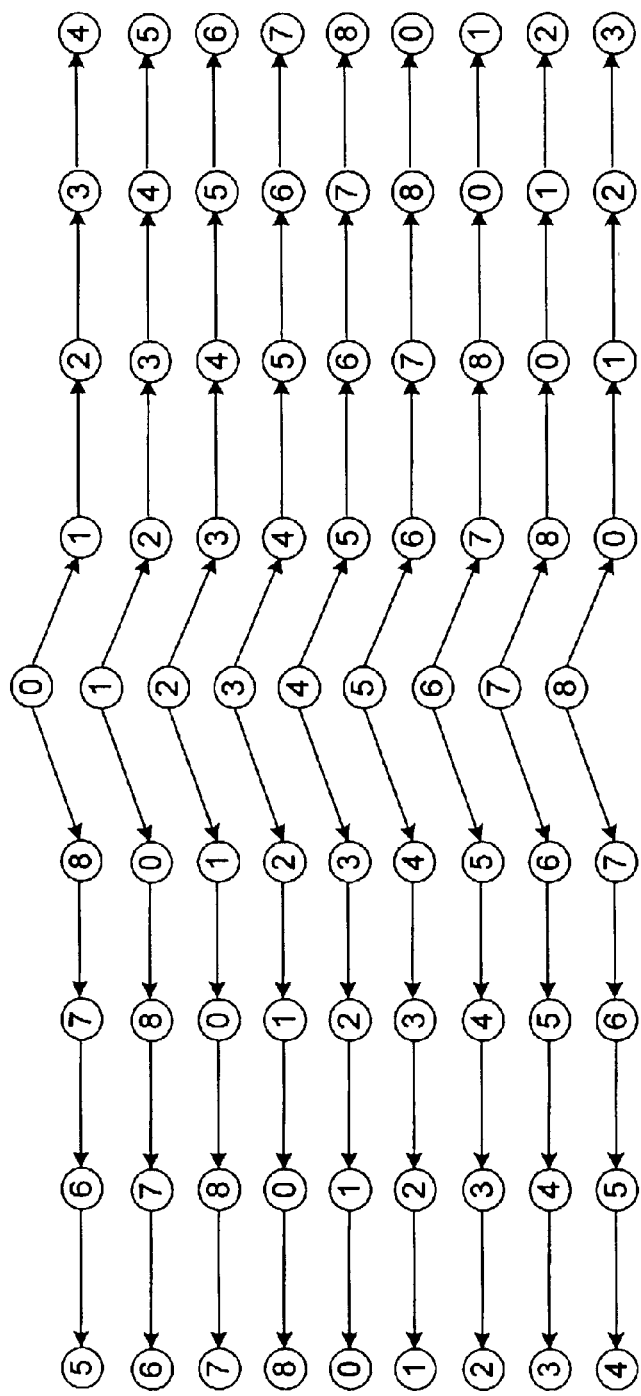
FIG. 9 illustrates a port-to-port shortest path map.

Effectively, there are 9 buses in the fabric chip. (9=8 ports+CPU port) However if a cross section is taken between any two ports, area for only 8 buses is required, because for any port n, its neighbor n+4 and n−4 are not connected. No bus is a truly closed loop. A shortest-path map from any port to any other port in this scheme is illustrated in FIG. 9.

Port-COS Pairs

Another portion of the fabric addresses Port-COS Pairs. Packets arrive as 8 byte words, but the RAM width is of 80 byte cells. This incongruity poses some utilization problems especially when packet lengths are at pathological cases such as CELLSIZE+1 (i.e., 65 bytes packets). If such condition persists, RAM bandwidth is compromised significantly, yielding a difficult 3.6 read/write per clock requirement.

In order to solve this problem, packets are packed and unpacked between RAM boundaries. Words are collected in a register file (or SRAM) FIFO until one cell size is ready before write. Cells are read from memory placed into a FIFO and then slowly given to the PIE as words.

This, however, poses another issue, in order to maintain SAP-to-SAP sequencing packets need to be placed in very specific places in RAM so that it's Ingress to Egress path is not corrupted by packets from other ports and class of services. Hence use of a "Port-COS" pair is introduced. A Port-COS pair consists of two numbers P:C. P designates which port the packet came from, and C designates which Class of Service this packet belongs to. Every packet that enters the fabric system is given a P:C designation (although this may not be represented by any memory elements), and they must follow a particular P:C stream in the system.

With respect to this system, P=9−1=8, because no packets will be destined for its own port, C=4 and P*C=32. Hence there can exist up to 32 streams in the fabric. For every port, there exist logically 8 Pack FIFOs, 8 queues in memory, and 8 Unpack FIFOs.

Message Ring

Another portion of the fabric is a Message Ring (MR). To connect all stations for control, another ring that is unidirectional, flopped at each station, and closed-looped is used. This ring provides a generic way of passing messages between stations (including the CPU). Currently it serves two major purposes: CPU register/memory-mapped access amongst all stations and accounting between Ingress and Egress Stations.

The messaging protocol on the MR can be analogous to that of an IEEE 802.5 token ring network, or an ISO 8802.7 slotted ring network. Register/counter read/writes, as well as memory requests and grants on the MR will be passed using this protocol. There are two requirements in choosing a protocol, it must 1) Satisfy the worst-case bandwidth required, and 2) The protocol itself must be robust and deterministic (testable) and never deadlocks.

The worst case bandwidth currently is bound by inter-station accounting. Inter-station accounting is a method to which Ingress can calculate how many bytes have been sent out by each Egress for all packets that entered the port. If not enough bytes are credited, it will enter BACKPRESSURE State after the counter reaches a programmed watermark.

In this mechanism, each Egress keeps a counter which tracks how many bytes it has sent our for packets that came from other ports. Hence it needs to keep 8 counters. After a programmed threshold, each Egress needs to report this counter's value back to the corresponding source Ingress. The MR has 9 stations on it, and it takes one clock per station. The worst case is 9*8=72 clocks before an Egress can zero out all its credits.

Adaptive Extended Memory

The above memory architecture, however, has a shortcoming. If only 3 ports are enabled, only 3*256 KB or 768 KB is available for packet storage. In fact, if the only traffic is two of these ports sending to the third port, only 256 KB can be used. The RAMs in the rest of the chip are wasted.

The adaptive extended memory architecture of the present invention extends to include an adaptive protocol to provide elasticity in memory usage. In order to negotiate the adaptation, a messaging protocol is used (via the MR). A port enters into PANIC mode when its number of Free Cells reaches a low watermark. In this state, the port will possess the next available slot on the MR and sends a memory request message. Only disabled ports can participate in granting memory usage to panicking ports. If the original request returns to the requestor after traversing the loop it indicates that either no port is disabled or all disabled ports are already helping someone else.

If the request message is processed and returns a memory grant message, the requesting port will stop accepting packets destined to itself. The granting port will start accepting packets on the behalf of it. Since all packets are visible to all ports, this exchange of packet ownership can be done, but not without caution. There are various relaying and hand-over timing intricacies that must be considered.

As an example, consider three active ports: numbered 0, 4 and 8, and five unused ports, numbered 1–3 and 5–7. Each active port is using extended memory of more than 256 KB of memory. Helper MMUs, such as in ports 5, 6 and 7, are accepting and storing packets on behalf of port 4, giving port 4 an effective memory usage of 1 Mbytes. Each helper MMU must maintain Pair-COS streams as well as following the priority algorithms present in the system.

Packets will drain from port 4, once its free cell count reaches a low watermark, it will assert a detach request message for it's helper port. Then port 5, the helper port next in line, will "slowly" drain its streams in memory to port 4. This effect propagates down the line of helpers. Until port 7's memory is completely drained, port 7 will issue a detach attempt message and a detach confirmation message. When detached, MMU 7 will be available for granting memory requests from any other port, including port 4. A helper MMU, when committed can only service no more than one other port. Each MMU can grab data off IBR at 80 Gbps. Each MMU can drain data at 10 Gbps.

The intent of the architecture is flexibility in attaching and detaching any number of "helper" MMUs to any port. Thus allowing dynamic allocation of embedded memory. The memory architecture allows for higher instantaneous memory capacity per port and better buffering.

MMU Theory of Operations

Figure 10:
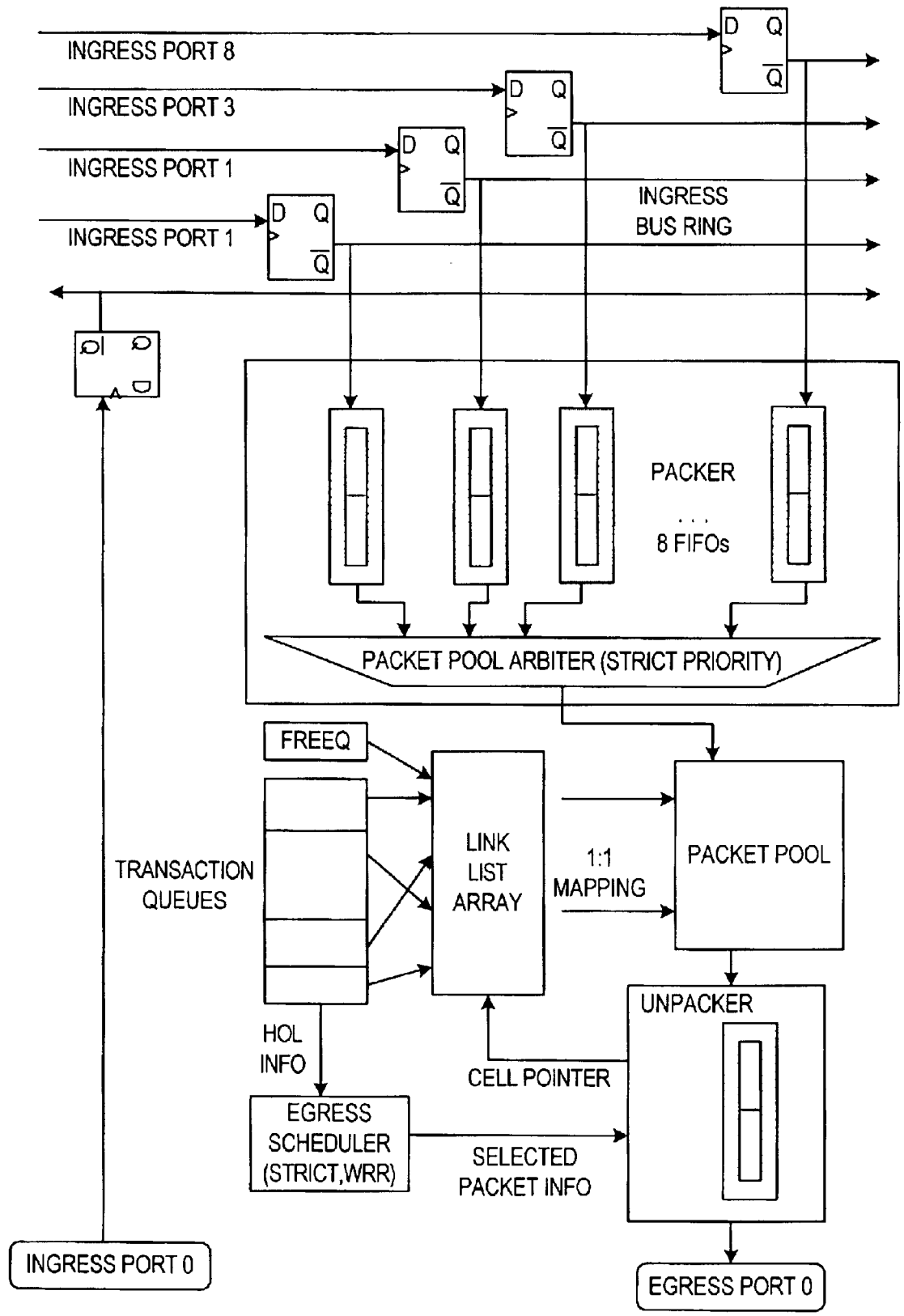
FIG. 10 schematic illustrating the memory management unit queuing architecture of the present invention.

The theory of operation of the MMU will now be discussed. With the MMU queuing architecture described, every packet that arrives at the switch fabric is globally broadcast to every port via the IBR. The architecture is illustrated in FIG. 10. A copy of the packet is stored only if the local MMU decides so. The following describes the local data structures as packets are stored and forwarded.

The Pack FIFO consists of 8 individual RAMs dedicated to eight Ingress ports, hence allowing parallel arrival of packets. Each RAM contains storage space that is 2 cells deep. Two cells allow 20 words or 160 bytes of storage. Each FIFO is used to store packets from the same port. Words are collected in the FIFO until a cell is accumulated and it is then written into memory. The process of packing of words into cells is independent of packet sizes. This is to alleviate the problem of wasted "holes" in memory when packet sizes differ from cell boundaries. There are a total of 32 logical FIFOs, each belongs to a unique Port-COS pair. This will guarantee in-order packet delivery and the correct re-assembly of cells at the output of the memory.

The Packet Pool Arbiter arbitrates the 8 Packer FIFOs for write access to the main memory (Packet Pool) in a round robin manner. Only FIFOs with a complete cell ready, or a FIFO that has timed out (see section on Time-Out Mechanism), is allowed to complete access.

FreeQ is a pointer to the current free cell (or block, this will be discussed later) that a new cell can be written into. A Free Queue for all available memory cells is maintained by the LLA.

Transaction Queues (XQ) is an array that contains 8 queues, one for each COS. The size of each queue is programmable. Each queue entry points to the head of a packet in memory, and the rest of the packet is maintained by a link list in the LLA. XQ maintains a Time Stamp associating each packet in memory with an age value. Packets that are too "old" according to a programmable value are dropped. The XQ has a limit of 2048 entries. Hence each Egress can only store up to 2048 packets (see PP).

The Link List Array (LLA) is an array that has a 1-to-1 mapping to the Packet Pool memory. Each offset in the array corresponds to a cell location-in the Packet Pool. Stored in the LLA are pointers to another cell. The LLA provides a convenient method for address indirection when manipulating data structures. The LLA maintains n+2 link lists. Where 'n' is the number of packets currently being stored and the 2 is the free queue plus a "graveyard" queue. The LLA also keeps a reference counter for each cell. This is necessary since the cell must remain active, and not returned to the free list, until all that refer to the cell no longer need to use the cell.

The Packet Pool (PP) is a 128 Kbyte SRAM used for the main storage of egress packets for that port. At 640 bits wide it has 1600 entries. The size of this RAM ultimately bounds how much can be stored. For example, it can store up to 2048 minimum size packets due to XQ limits, but it only store up to 82 maximum size (1518 bytes) packets, and only 14 jumbo size (9 Kbytes) packets.

The Egress Scheduler (EGS) determines the next packet to be transmitted out the PIE. It follows the priority rules programmed in the system and fetches a packet, cell by cell, according to the information given by XQ and LLA.

The Unpacker (UPK) is a twin to the Pack FIFO in that it smoothes out the incongruities between word and cell in this system on the way out. It is different however because only one port needs to read from it at a time, at $\frac{1}{8}^{th}$ the speed, so only one RAM is used.

The MMU design is a pure packet store-forward engine. The need to peek into the packet has been eliminated in order to facilitate support of dissimilar protocols. The MMU supports the following packet formats: minimum size packets of 64 bytes, Maximum size packets of 9 K bytes, a module header and a preamble header. In addition, trunking and mirroring support are seamless since MMU only reacts to a port bitmap sideband signal transferred on the IBR.

The basic flow of a packet is like this: the first Word of the packet is seen on the IBR for port m, indicated by the RXSTART for port m and the COS of the packet is determined, indicated by the field in the word header area. This word is stored into port m's Packer RAM in a logical FIFO according to COS. Subsequent words will be stored into the same COS FIFO, until RXEND is detected for port m.

Meanwhile, if one cell (10 words) have been accumulated in any of the COS FIFOs for port m, it is good to go into the Packet Pool RAM. It is noted that all other ports are doing the same thing. Hence potentially all eight ports can have a cell ready to be written into memory at the same time. The Packet Pool Arbiter grants writes to RAM in a round robin manner amongst all eight ports at every clock, and since it takes eight clocks to accumulate a cell, the bandwidth is sufficient. When a cell is good to go, the Packet Pool Arbiter uses the FreeQ pointer, and writes the cell into memory. A link list is built (if have not already done so) for the packet. Then the LLA is updated with the new Free Queue and the new packet link list. This process is repeated for every new cell.

A RXEND is detected and the pointer to the head cell of this packet is pushed onto the XQ it belongs to. The Egress Scheduler notices that there is a packet in the XQ which need to be serviced according to its priority algorithm. It notifies the UPK, giving it the COS number. The UPK deems that it is ready to transmit, it fetches the pointer from the top of the given COS from the XQ, and uses it to read the first cell from memory from the LLA. The UPK puts the cell into the FIFO according the Port-COS pair that it belongs to. TXSTART is asserted to the PIE and when TXREADY, words are clocked to the PIE for transmit.

All cells from RAM are fetched for that packet until EOP (indicated by the size field from XQ). The pointers for each cell are provided by the LLA, which at the same time decrements the reference count for that cell. If the recount reaches zero, the cell is put back into the free queue. TXEND is asserted at the last word. Unpack FIFO puts the cell into the FIFO according the Port-COS pair that it belongs to.

Several scenarios are possible. One scenario is directed to multiple packets ending on non-cell boundaries. As an example, for the same Port-COS, another packet, say B, arrives immediately after the example above. It is 81 bytes. Immediately afterwards, another two packets say C and D, arrive, both also 81 bytes, and N bytes respectively.

After 81 bytes (or 10 words) of receiving B, it will be given a cell in the PP and an entry in the LLA is created for it. After 1 byte of B, and 72 bytes of C, another cell is granted and together they are written into memory. An corresponding entry in the LLA will be modified to link to the cell used in 1. Since RXEND has been received for packet B, an entry is created for it in a COS queue in the XQ. EGS decides packet B gets to be transmitted. It fetches the first cell from memory and UPK places it in its FIFO. 81 bytes of B transmitted and EGS fetches the next cell for packet B, and places into the same Port-COS Unpack FIFO.

Then, 1 byte of B transmitted. Now, during all this, packet C also finishes arriving. C will be stored as cells in memory, and entries created in the XQ with an offset value of 1. The reference count for the cells which B+D, and C+D resides in will be 2. Noting the new entry for C in the XQ, EGS/UPK can fetch the rest of C (since part of it was already read via B) into the Unpack FIFO when the transmit process drains the FIFO to a pre-determined threshold. C can now be sent out. Lastly, parts of D in the Unpack FIFO, in the PP RAM, and in the Pack FIFO are left.

A second scenario is directed to time-out mechanisms. Now, it is assumed that packet D is the last one for that Port-COS and does not end in a nice 80-byte boundary. A few bytes of it sits in the Pack FIFO, several cells in the PP, and 64 bytes of it sit in the Unpack FIFO. If no packet arrives at this Port-COS after time $T_{flush}$, the contents of the Pack FIFO will be given a green light to go into RAM. And it will take up a cell in memory with the remaining bytes at random. And an entry will be created for D in the XQ. This "flush" timer mechanism is used to prevent stagnant FIFO data. The XQ entry for D will have an offset of 2, and once an entry is created in the XQ for D, EGS then will be able to retrieve the packet out of RAM according to steps discussed earlier.

If the egress MAC is congested, (i.e., some high bandwidth stream is hogging the port, or TXREADY is never observed), the packet D maybe trapped in memory. There are two courses of action: 1) In the event of Pack FIFO congestion, $T_{flush}$ will trigger a special condition and allow the remaining bytes of packet D to be written in memory. 2) If the port is idle, after time $T_{drop}$, the packet will be deemed too old and will be dropped, both from PP and possibly the Unpack FIFO if it also partially resides there. The age of the packet is determined by its time tick field in the XQ.

A third scenario involves starvation or over-subscription of ports. In the case of over-subscription or a bad link, packets will accumulate quickly in the PP and when a threshold is reached in the XQ, back pressure is asserted to all offending ports to indicate a BACKPRESSURE state. This is done through a crediting system on the MR. If Packets remain in the XQ for over $T_{drop}$, they will be dropped.

In general, no packets are allowed an entry in the XQ if it is incomplete, dropped due to purge, or dropped due to lack of buffering. A packet, once assigned a Port-COS, never leaves that Port-COS stream. This is true for the life of the packet in the system, despite which physical RAM it resides in. Since each packet is assigned a Port-COS, and each write to memory is from only one Port-COS, no cell in memory will contain two packets from distinct Port-COSs. Since packets must be no less than the 64 bytes minimum size, no more than three packets can reside in the same cell, given an 80 byte cell size. $T_{drop}>T_{flush}$ and thus no packet drop event will require the clearing of Unpack FIFOs.

Message Ring Protocol

The message ring will use a token passing protocol with some restrictions on token holding time to guarantee fairness of bandwidth allocation and to bound the maximum time for a station to be granted a token when it needs one. The ring itself is a 33-bit bus. Bits [31:0] contain a 32 bit message word, and bit [32] is the token. At any one time, zero or one token is on the ring. Messages consist of one to three words; the first word of the message describes the message type, which also implies the message length. A token bit is only ever attached with the final word of a message.

All messages start with a common format having a first word of MR message. The six-bit opcode specifies the message type and implicitly specifies the message length. The five-bit destination station comes next, then the five bit source station (the one originating the message) follows, and finally a 16 bit message-dependent portion. Some messages have a second and perhaps a third 32b data word, containing things like memory addresses, read data, and write data.

Certain messages are handled as a split transaction; this means that a request is generated by one station, and at some later time, perhaps after many other messages have circulated on the ring, the responding station sends back an acknowledgement message.

Accounting Block

Another portion of the MMU is an Accounting Block (ACT). This logic accepts a stream of 64b words at the core clock frequency from the MAC, along with some sideband information generated by the PIE. There is no direct ability to halt the stream of words coming from the MAC. All packets must be accepted (although they might be dropped later for lack of capacity). The block is also responsible for tracking resources used by packets that arrived on that ingress, and requesting that the MAC enter or exit a PAUSE state as appropriate.

The ACT maintains a 16 bit counter that indicates the number of octbyte words that a given ingress has launched into the MMU and is presumably using up resources. The name of the register is MMU_REG_IngressWordCount. It is reset to zero and increments every time the PIE sends a valid word on the IBR (as indicated by the PIE_mmu_vf bit). As octwords are egressed or are dropped for whatever reason, the count of these octbyte words are occasionally sent back to the ingress via the MR IngressCredit message and are subtracted from the count of outstanding words.

Figure 11:
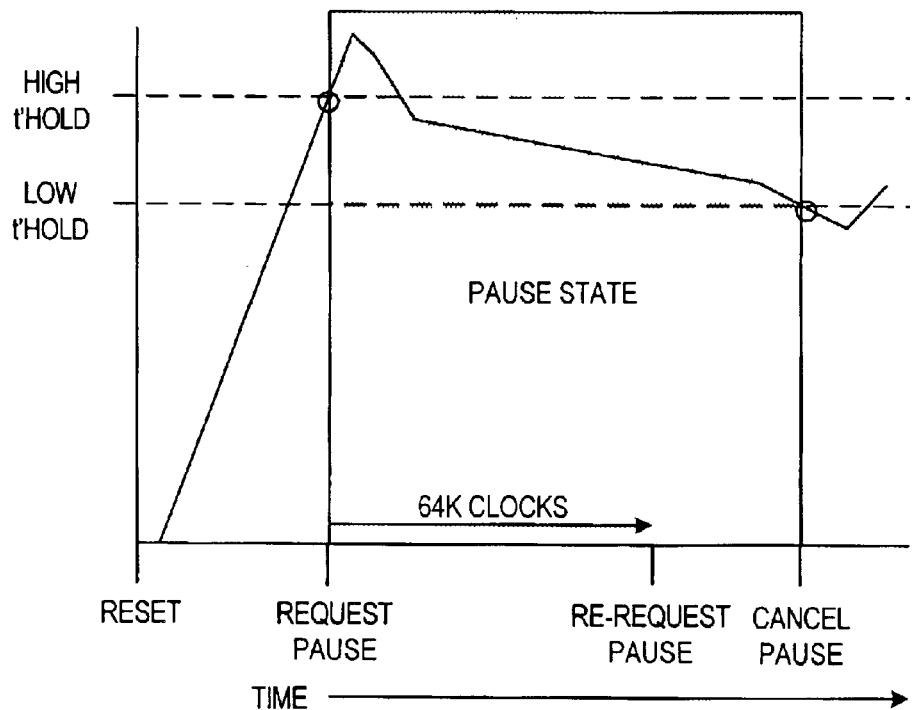
FIG. 11 illustrates accounting block pause behavior.

Thus, over time, this count goes up and down. If the count is too large, the ingress will request the MAC to send a PAUSE to its link partner in order to slow down the traffic entering the chip. If the if the input rate drops and becomes more reasonable, ACT will request the MAC to leave the PAUSE state. The behavior is shown in FIG. 11. Although the MAC allows requesting any PAUSE timer value from 0x0000 to 0xFFFF, the ACT block only ever uses two values: 0x0000 or 0xFFFF. 0xFFFF is used when requesting PAUSE, and 0x0000 is used to request that PAUSE be cancelled. It is possible that even though PAUSE state it entered for the lower hysteresis limit is not met for 64K cycles. In this case, the ACT unit will request the MAC to send another PAUSE request to ensure that the PAUSE state is maintained. This too is shown in FIG. 11.

Ingress Bus Ring

The Ingress Bus Ring (IBR) module is relatively simple and has just a few purposes. Firstly, the input buses get clocked before forwarding the data to the next station. This eases the top-level timing as the path is point to point from adjacent stations on the ring. Secondly, the IBR is where the port shuffling occurs. That is, the input buses get shifted one position before being sent out on the output buses. This allows stations to have uniform, non-overlapping bus wiring yet still have abutting placement at the top level. Thirdly, the IBR implements a power optimization strategy. As each word arrives on an input bus, its egress map is inspected. If no downstream station needs that word, the output bus is held constant, except for the Valid bit, which is set false.

Each of the bits of the eight lanes on the IBR has an assigned meaning. Although there are nine stations on the IBR, there are only eight lanes at any one cross section due to the "wing" topology of the "ring." With respect to each station, four stations are upstream and four are downstream. Each station registers its outputs, preventing having to send so many signals all the way around the chip in one cycle. Instead, it is replaced by the complexity of having a different latency from one station to each other pair of stations. The different bits of each line are exactly the same information that is generated by the PIE block. As power optimization, a station may hold all the bits of a bus constant and propagate a FALSE "valid" bit if either the incoming word isn't valid, or if the station detects that the egress port map does not have any downstream targets. Each station on the ring has eight input busses and eight output busses; four go clockwise, four go counter-clockwise.

Figure 12:
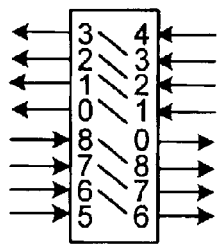
FIG. 12 is a schematic detailing one station of the ingress bus ring.
Figure 13:
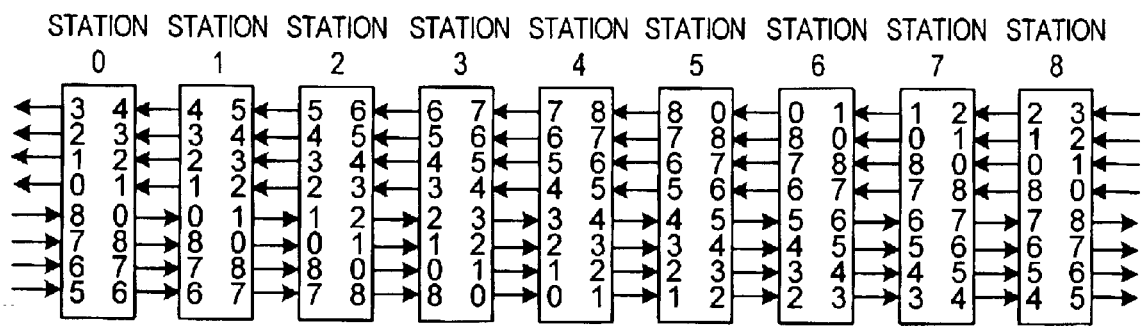
FIG. 13 is a schematic of the ring connectivity of the ingress bus ring.

FIG. 12 shows what one station looks like, while FIG. 13 shows how the ports of each station connect to each other. It is noted that the logical mapping of ports to ingress bus changes at each station, but the topology of inputs to outputs is constant. This means that only one layout is necessary.

The ability to use a single layout is important to the invention. This topology means that stations that are adjacent on the ring can be adjacent on the physical chip and can abut without any wasted space between them for connecting them together. Any other topology would require wasting space between physical blocks to connect the outputs of one block to the appropriate inputs of the neighboring block. This also makes testing easier since each "tile" of the IBR is the same. It is also noted that port 0 in FIG. 13 drives in both directions, while the other ports all pass through or terminate at the station. This is because Station 0 sources ingress 0 data. A four-bit identifier is given to each station on the ring so it knows its identity.

Message Ring

The Message Ring (MR) relies on the following protocol. Initially on reset, there is no token. After a few cycles have gone by, station 0 will mint a token and send it on the ring. This token word will continue to circulate until a station has need to send a message. Such a station will wait until it sees a token arrive on its input bus. As this token is associated with the final word of the incoming message, the station will pass on bits [31:0] to its MR output port, but it will strip off the token bit. In the next cycle the station that just grabbed the token will start streaming out any messages it wants to, subject to requirements noted below. When the station has finished sending out messages, it sets the token bit of its output bus to '1' on the final word of the final message.

There are three classes of messages: 1) ReadRegister, WriteRegister, ReadMemory, WriteMemory; 2) ReadRegisterAck, WriteRegisterAck, ReadMemoryAck, WriteMemoryAck; and 3) IngressCredit. Only the station associated with the connection to a CPU may send type (1) messages. Further, only one such message can be outstanding at any one time. "Outstanding" means that that the type (2) message that completes a type (1) message hasn't yet been received by the sender of the type (1) message. A station sends a type (2) message only in response to a type (1) message.

During one token ownership time, only one message from each of the three classes can be sent. This has the following consequences. The CPU connected station can hold the token for at most four cycles, as it can send a three cycle WriteMemory command and a one cycle IngressCredit message. Although it may generate a type (2) message in response to a type (1) request, it won't happen in the same token holding time. Other stations will hold the token for at most four cycles as well, as they can send a three cycle ReadRegisterAck message and a one cycle IngressCredit message. With nine stations on the ring (CPU connected station plus eight XAUI ports), it will take at most 15 clocks for a token to make a complete circle. This is because only one type (1) and one type (2) message can ever be generated during one cycle of the token, therefore two stations take four cycles each and seven stations take one cycle each.

Packer

The purpose of the packer (PK) block or unit is to accept a stream of 64-bit words from each of the eight other stations. The egress port map that is associated with each packet is used to determine which packets are to be read off the ring by a given station. As the data words from a given ingress arrive via the IBR, each stream is assembled into 640b "cells." When a cell is completed, it is transferred within 8 clock cycles to the PP (Packet Pool). The eight packing units (one corresponding to each ingress) arbitrate between themselves using strict priority to gain access to the PP. Because each cell contains ten words and a minimum sized packet can consist of as few as eight words, it is possible to have multiple packet fragments in one cell.

Figure 14:
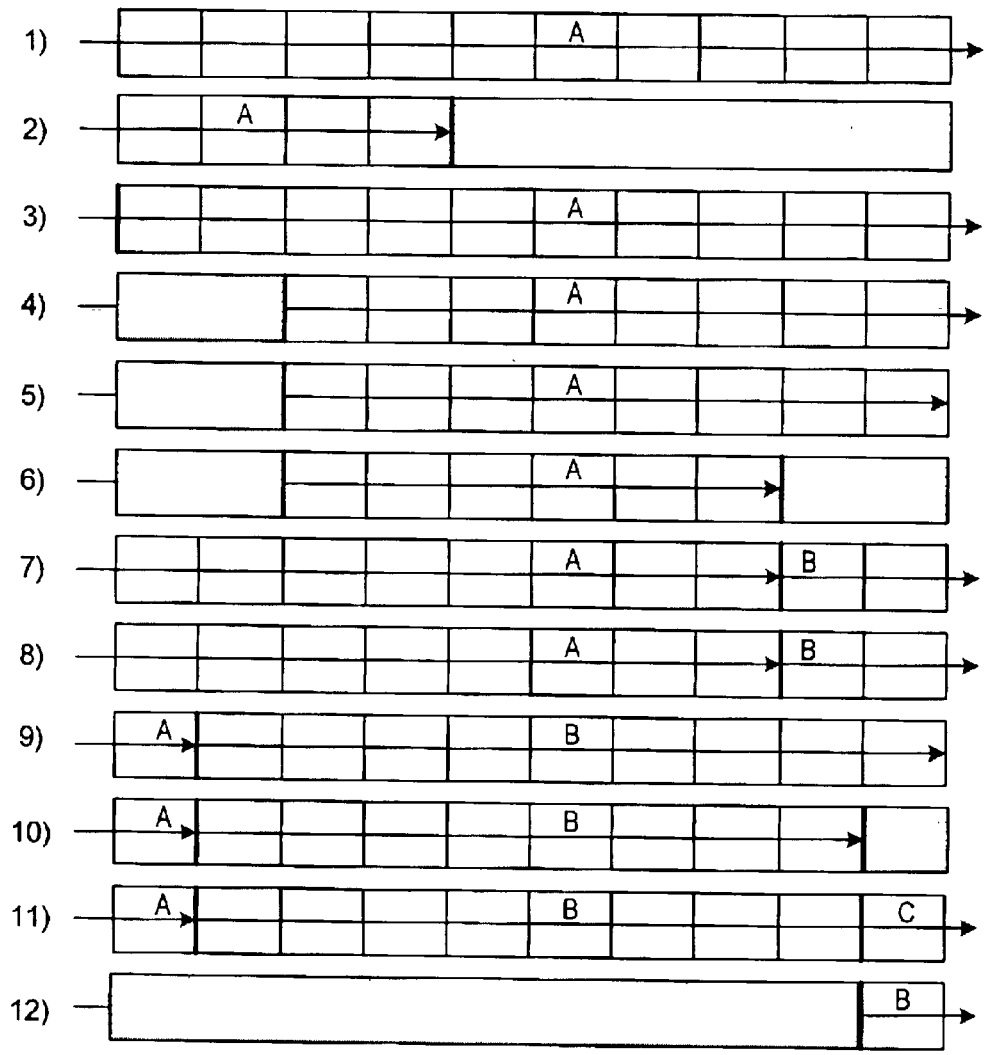
FIG. 14 is schematic illustrating the different packet boundary cases within one cell of the memory.

FIG. 14 shows some possible cases of how packets can group within one cell. Each small box within the cell represents an 8-byte word. The arrows with the label "A," "B," or "C" above it show packets. Grayed-out boxes show unused portions of cells; the reasons for these are given later. The heavy bars show the boundaries of a packet. Note that a cell can contain fragments from up to three different packets, and that a cell can contain at most two boundaries between cells. Packets are not necessarily contiguous in a cell, due to the dead words in the grayed-out boxes.

The grayed-out boxes in FIG. 14 can arise for a few reasons: a case like #2 can arise when an ingress stops sending packets for a while; eventually the PK unit will just send the unfinished cell to the PP unit anyway to prevent stranding packet "A" in the PK unit. Other gray boxes can occur if the MAC unit signals a purge request after the packet has already started. Rather than rewinding all the pointers and such, the PK unit just signals those words involved as being dead. A final reason for grayed-out boxes happens when the PK unit attempts to write a packet to the LLA and one or more fragments can not be successfully written due to some type of resource constraint.

The function of the packing is to conserve bandwidth, and to rate match the narrow IGB lanes to the wide PP interface. If the PK unit didn't allow multiple packet fragments in one cell, there could be incredible inefficiency in memory use and bandwidth. For example, if the traffic consists entirely of 88-byte packets, one packet would require two whole cells, of which only 11 of the 20 words would be occupied (55% utilization).

Link List Array

The Link List Array block is the link list brain of the MMU. It performs the following functions: accepts write requests from the PK for each packet, creates a link list for every packet and governs it's XQ entry insertion, and accepts read requests from the UPK, frees cells which are no longer needed by packets. The LLA also maintains a free queue link list, maintains reference counters for each cell and performs purging of packets due to explicit or implicit conditions, return purged link lists back to the free queue.

To recap, there are 8 distinct cases in which packets (A, B, and C) can reside in a 80-byte cell (see FIG. 14).

| | sof0 | eof0 | sof1 | eof1 | | | |
|---|---|---|---|---|---|---|---|
| 1) | 0 | 0 | 0 | 0 | [ | A | ] – DoMID |
| 2) | 0 | 1 | 0 | 0 | [ A | >\|xxxxxxxxxx] – DoEOF | |
| 3) | 1 | 0 | 0 | 0 | [xxxxx\|< | A | ] – DoSOF |
| 4) | 1 | 0 | 0 | 1 | [xxx\|< | A | >\|xxx] – DoONE |
| 5) | 1 | 0 | 1 | 1 | [xx\|< | A | >\|< B ] – DoONESOF |
| 6) | 1 | 1 | 0 | 0 | [ | A | >\|< B ] – DoEOFSOF |
| 7) | 1 | 1 | 0 | 1 | [ A >\|< | B | >\|xx] – DoEOFONE |
| 8) | 1 | 1 | 1 | 1 | [ A >\|< | B | >\|< C ] – DoEOFONESOF |

The eight cases are adequately encoded with the 4 signals (sof0, sof1, eof0, eof1) from the PK. By decoding it, the LLA performs a specific transaction for each instruction.

There are two types of purges in the LLA: Explicit and Implicit.

Explicit Purges: PK assert "purge" bit at EOF to indicate a bad packet. LLA will purge accordingly.

Implicit Purges: PK makes write attempt, however, as the previous write is processed "full" becomes true. LLA thus no longer have room to store the packet and will drop the packet. PK, on the next cycle, must realize what happened. It should discard and credit back remaining bytes PLUS the bytes that were just given to the LLA. It is noted that PK never does an explicit purge even if it samples full signal from the LLA, PK samples the next clock to see if the attempt succeeded. This is because during the previous cycle a cell may free up.

There exists four triggers for the full condition:

1) PP becomes full—no more cell buffer free in memory)
2) COS class in the XQ reaches packet usage limit
3) COS class in the XQ reaches word usage limit
4) XQ Request fifo becomes full in the LLA block (rare)

Conditions 1) and 2) and 4) are implemented in the LLA block, while 3) is implemented in the XQ block.

When a purge, either implicit or explicit, is required, the LLA must relinquish the link list occupied by the offending packet to the free queue. Since each cell may have up to three packets residing in it, this creates a rather resource-heavy operation. The worst case operation in which this performs is:

1 LLA(Port.Tail)=LLA(FreeHead);
2 FreeHead=LLA(Port.Head);
3 UsedCellCount=UsedCellCount−Port.CellCount;
4 LLARefCnt(Port.Head)=LLARefCnt(Port.Head)−1;

1,2: Link list operation to prune and graft the purged cell back to the free list.
3: update cell count in the system.
4: update the reference counter for the head cell of the packet.

Since operations 1,2,3,4 causes resource conflicts, the following parallel logic is devised:

1 GraveYardHead=Port.HeadPtrPurge;
   LLA(Port.Tail)=GraveYardTail;
2 FreeHead=Port.HeadPtrPurge;
3 PurgedCellCount=PurgedCellCount+Port.CellCount;
4 LLARefCnt2(Port.Head)=1;

1) GraveYard pointers retains a single link list for all purged cells. This link list rejoins (through DoIncarnate) during a UPK read or a available free cycle. This avoids having to relink the purged link list at the same time as the write.

2) HeadPtrPurge tracks properly where the grafted link list of the packet should start by looking at SOF and purges for the SOF cell and subsequent DoMID cells that are next in line. Thereby avoiding and extra lookup in the LLA when the HeadPtr cell for the purged packet is also used by another packet.

3) PurgedCellCount is a separate counter that keeps track of exactly what it says. It is merged with UsedCellCount upon DoIncarnate cycle.

4) LLARefCnt2 is a secondary ref count memory, which is used upon DoReadCell to determine the final ref count for that cell location. This is useful when the HeadPtr cell of the purged link list is also used by another packet, hence it's Frag Count needs to be −1.

With above implementation purged cells, under heavy write conditions may pose a delay in the availability of the free pool until the next free cycle or read cycle. Since the clock and memory access bandwidth has been over designed, a free cycle is imminent within 8 ticks.

Memory Corruption Recovery

Figure 15:
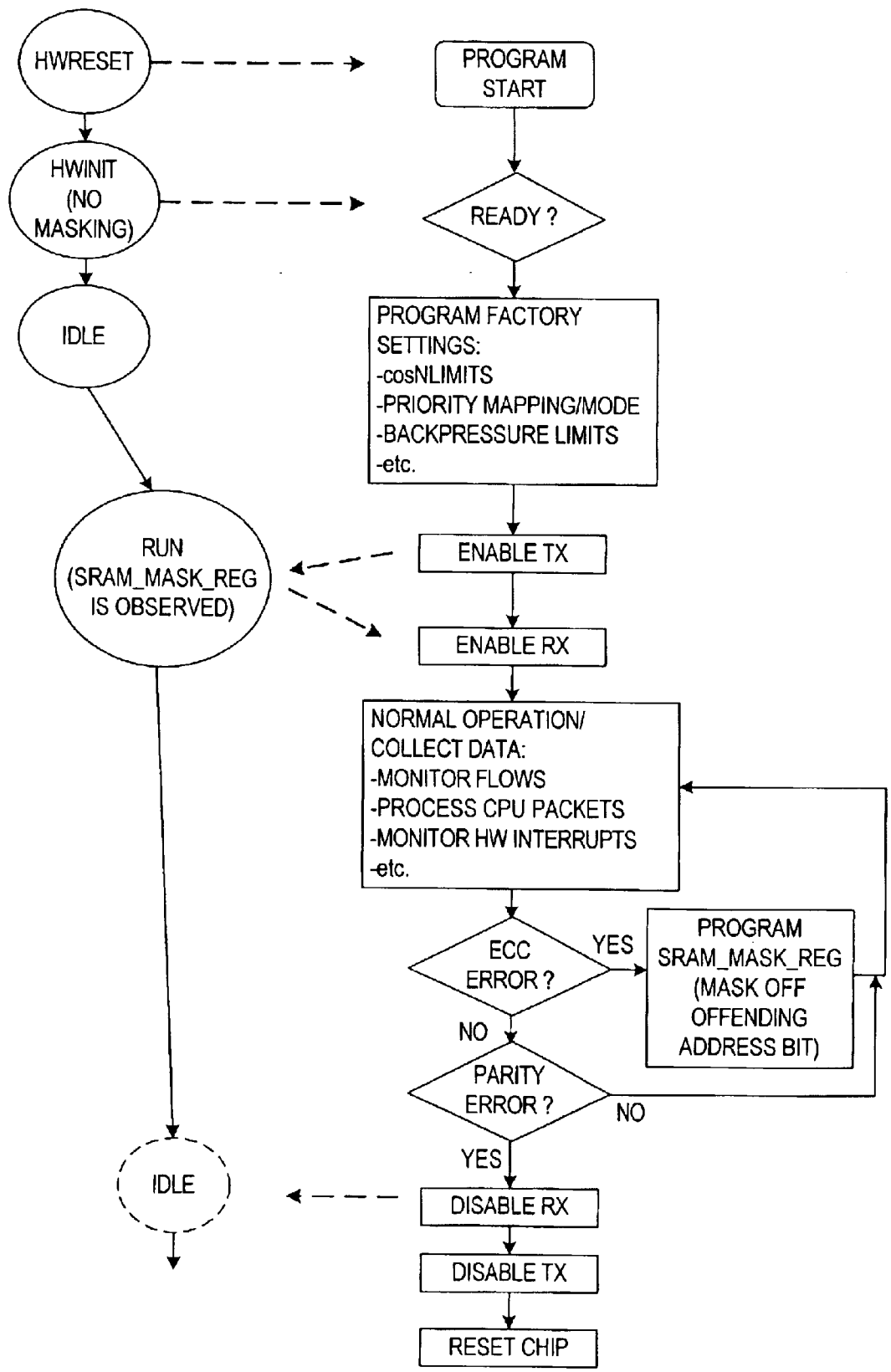
FIG. 15 is a flowchart illustrating the memory corruption recovery scheme of the present invention.

To guard against possible memory failure in a risky 0.13 um process and RAM usage, the fabric of the present invention has devised a way for software to detect memory errors and recover from such failures to continue to function. The MMU's memory recovery feature is illustrated in FIG. 15. The left side of the figure illustrates the hardware states and the right side shows the software flowchart. The software flowchart controls the state transition of hardware and the flow is horizontally aligned. This diagram shows the ability for the fabric to dynamically mask out corrupt addresses in the main memory, as well as recovery through a software reset sequence. It is important to note that, there are two types of memory errors which the system detects: #1 ECC Errors in the main memory pool, and #2 Parity Errors in various utility SRAMs. As shown, #1 can be dynamically detected and masked through software and #2 can only be recovered through a software reset sequence.

Packet Pool Memory

The Packet Pool (PP) Memory block is a wrapper for the Packet Pool SRAM macros which store packet data from the PK module. After the PK unit has packed a series of words into a cell, the cell is written atomically into the PP, at an address determined by the LLA. The packet will live in the PP until the UPK block reads out all of the packet fragments from the cell. There may be 1, 2, or 3 packet fragments in the cell depending on the alignment.

This SRAM supports one read or one write per core clock cycle. Under maximum instantaneous load, there are eight writes (one from each ingress) and two reads (for egress) per nine cycles. This maximum load condition can be tolerated up until the PP fills up. Typically (and sustainably), however, there is one write and two reads per nine cycles.

Packet Pool Control

The Packet Pool Control module computes Error Checking and Correction (ECC) bits for write data from the PK, checks (and possibly corrects) read data to the UPK, and provides host read/write access (via the MR). ECC errors are logged and counted and made available for the host to read via the MR.

In order to guard against possible errors in the Packet Pool memory, extra ECC bits are appended to the data. Because of the extremely wide interface to the RAM, it would be impractical to have a single ECC parity group for all the bits. Instead, ECC is computed on four 160 bit words. Each word is protected by 9 ECC bits. This is enough to provide full SECDED (single error correct/double error detect) coverage. In order to further protect against SRAM failures, each group of ECC bits is computed with the address appended to the data. This helps detect cases where the SRAM might read the wrong address.

Transaction Queues

The transaction queues (XQ) supplies the ordering information to the packets. The XQ implements a first in first out queue for eight COSes. Essentially, the entry is a pointer into the PP, indicating where the packet is stored, along with an indication of the size of the packet. This information is supplied by the PK interface at the time the cell containing the final word of a packet is written to the PP. The information is stored in the XQ includes fields for a Tick, packet size, offset, ingress port # and a pointer:

The pointer is the head pointer to the packet in memory. The Ingress Port number denotes which port this packet came from, and is used for the UPK. The offset indicates where in the cell this packet actually starts (effects of the PK packing). Packet size supports byte-based weighted fair queuing and is also used by the UPK. Tick is a time stamp replacement, which was discussed above.

The 2K entries can be subdivided into up to eight different queues for different COS levels. The size of each COS class is programmable via packet limit registers, but the total of all the defined classes must be 2K or less. By sorting packets into separate queues for differing COS classes, it allows higher-priority packets to egress before lower-priority packets, even if the lower-priority packets arrived first. While the LLA module supplies data for the XQ entries, the egress scheduler block (EGS) reads the four oldest entries from each of the eight COS classes to decide which packet to send next.

The XQ implements a special way for packet aging, which alleviates the problem of storing wide time stamp vectors for each packet as well as the wrap-around problem for the vector value. The 3 bit Tick value represents the "time stamp" for a packet. Every tick represents a time specified by the register for the maximum egress time, where the register is a 24 bit register. The granularity is 34 us and it specifies how often a tick happens. The "Tick" value saturates at 7 and a 7 Tick value for any packet indicates the packet is too old and will be purged.

For example, for a value of EgrMaxtime=24'h1E6928 (=1.993*10^6 in dec), a tick will occur ever 1.993E6*34 us=68 seconds. Tick saturates after 7 ticks, which is 68*7= 480 s=8 minutes. Hence, all packets that are 8 minutes or older will be discarded.

Egress Scheduler

While the XQ contains the order of packets within a given COS class, it is the responsibility of the Egress Scheduler (EGS) to pick which of the eight COS classes gets to send a packet next. EGS can be programmed to enable different types of queue scheduling algorithms.

In one embodiment, a Strict Priority Based Scheduling algorithm is employed. With this algorithm, the highest priority queue has all of its outstanding packets egressed before any lower priority queue gets a chance. If the highest priority queue is empty, then the next lower priority queue has its packets egressed, and so on. If a packet enters the queue of any higher priority queue, the current packet finishes egressing and the higher priority queue is serviced. The main disadvantage of this scheme is potential starvation of low priority queues.

In a preferred embodiment, a Weighted Round Robin (WRR) Scheduling is employed. This scheme alleviates the disadvantage of the Strict Priority Based Scheduling Scheme by providing certain Minimum Bandwidth to all the queues, so that none of the queues gets starved. The Bandwidth is really a programmable parameter in some sense in the EGS and is programmed by the switch application.

Each COS is assigned a weight through a register. This weight is passed on to a meter register which decrements upon every Packet Exit event for that COS. When all COS meters reach zero, the meters are reloaded with the programmed weights. A "peg" is kept to provide round robin arbitration between the eight COSes, i.e. each queue is allowed to send one packet for each round of arbitration, until it's weight value decrements to zero.

If no packet is available for the COS the peg is at, the other COS queues are allowed to compete for the slot using a circular priority treatment, i.e., if peg is at 2, then 1->0->3 gets evaluated in that order. If peg is at 3, then 2->1->0 gets evaluated in that order. COSs whose weights that are zero at the time are not eligible to compete. However, if no other COSs have packets available, it will be allowed to go so that bandwidth is not wasted (this is the work-conserving aspect).

It is noted that in the WRR mode, although the arbiter may grant COS X to go, the actual transmission logic is allowed to choose to let a different COS queue to exit. This in fact is allowed and will not effect the WRR internal operation. However, the de-coupling nature of such operation will likely deviate from the fairness/weight originally intended by programming.

One disadvantage of WRR is that it becomes unfair in pathological cases. For example when one channel is transmitting many long maximum size packets and an another transmits 64 byte packets. The "mini-gram" channel's bandwidth is compromised when bandwidth allocation is based on packet count. Many studies have been done on fair scheduling. While the most theoretically ideal queuing algorithm known as General Processor Model (GPS) is not feasible in implementation, a better approximation can be done with a Deficit Round Robin algorithm. The later algorithm can be supported in alternate embodiments. The algorithm matches closely to the min-max requirement of weighted priority scheduling. The algorithm is Work Conserving, i.e., resource never idles if packet awaits service. It is byte-based, allowing closer tracking of real traffic throughput.

The "weight" for each channel is relative to a "quantum" value one assigns to the algorithm. In fact, each channel's weight is an integral multiple of the quantum value. The quantum value should be set to an appropriate byte length of the traffic pattern. In the Ethernet world, the traffic profile has a bi-modal distribution centered around 64 byte and 1500 byte packet lengths.

Unpacker

Figure 16:
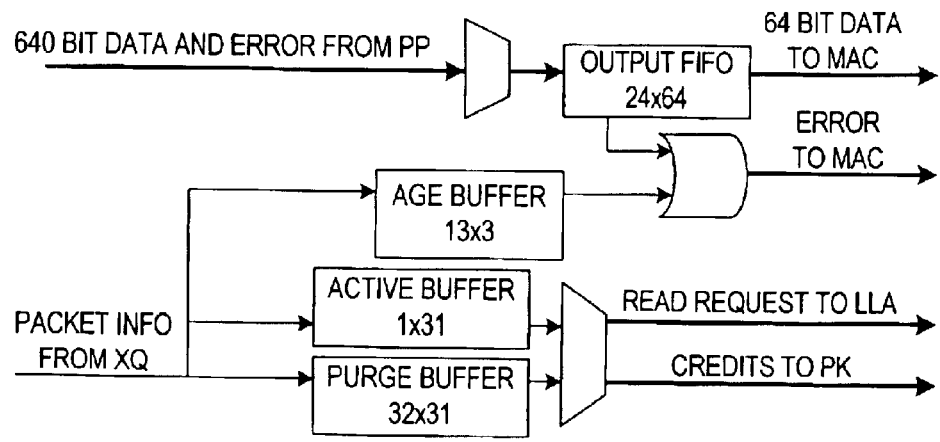
FIG. 16 is a block diagram for the unpacker for the present invention.

The Unpacker (UPK) reads cells for packets selected by the EGS and reformats them into 64 bit words for the MAC. A block diagram for the unpacker is illustrated in FIG. 16. The unpacker requests a new packet via a signal and when this signal and a ready signal are both true, then a new set of packet information will arrive from the XQ on the next cycle.

The unpacker uses the information from the XQ (size, pointer, port, etc) to create a sequence of read requests to the LLA for each packet. The first address read for any packet is the pointer received from the XQ. Subsequent reads use the value received from the LLA. Note that the interface allows LLA reads to occur on consecutive cycles. When the UPK needs to do this, it asserts a signal that causes the LLA to read from the next cell pointer location instead of cell pointer. This eases timing by eliminating the need for the UPK to combinationally generate the cell pointer from next cell pointer. Note that the LLA can stall UPK reads as necessary.

The read data from the PP memory arrives at the input of the packet pool control module after a fixed delay (4 cycles) from a successful read request to the LLA. The ECC pipeline within the packet pool control module requires two cycles to check and possibly correct errors from the RAM. These two pipe stages are used as buffers by the UPK module. The appropriate words of the cell data from the packet pool control module are multiplexed and inserted into the Output FIFO at the rate of one word per cycle.

When packets within the XQ age-out, the packets are purged from the PP memory but not sent to the MAC. Aged-out packet info is placed into the Purge Buffer so that another packet can be popped. By placing the purged packet info into the Purge Buffer, the UPK can keep searching for good packets thereby minimizing any interruptions in the flow of data to the MAC. The UPK can issue reads for both good packets and purged packets on a cycle-by-cycle basis. When both good and purged packets are being serviced, priority is given to the good packets. Purged packets are read from the LLA just like good packets except that a purge signal is asserted. This causes the LLA to free the indexed cell but avoid issuing a read to the PP memory (thereby avoiding corruption of data to the MAC).

Since the packet pipeline to the MAC within the UPK is fairly long (up to 13 packets depending on size and alignment), it is probable that packets residing within the UPK will occasionally age-out. To accommodate this, the age of each packet is maintained within the Age Buffer. As packets arrive from the XQ, it's age is recorded in the Age Buffer (which is organized as a FIFO). Whenever the input timetick is asserted, all of the ages are incremented by one (but saturate at 7). As each packet is sent to the MAC, it's age is popped from the Age Buffer. Packets whose age is 7 will have an error signal asserted on the last word.

In order to allow the ACT module to properly issue pauses to the MAC when a port's PP memory is full, the UPK sends credits to the PK module via signals sent after every successful read to the LLA (both for good packets and those being purged). On every cycle, the UPK outputs the number of aged-out packets received from the XQ or which are aged-out when output to the MAC. A total count of aged-out packets is also maintained.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of forwarding data in a network switch fabric, said method comprising:

reading a first packet portion of an incoming data packet containing a destination address;

determining an egress port bitmap based on the first packet portion;

forwarding the incoming data packet based on the egress port bitmap, when the destination address does not belong to a trunk group; and determining a particular trunked port of the trunk group and forwarding the incoming data packet thereto, when the destination address does belong to the trunk group.

2. A method as recited in claim 1, further comprising determining the particular trunked port of the trunk group by calculating a hash value based on the destination address and selecting the particular trunked port based on the hash value.

3. A method as recited in claim 1, wherein said particular packet information includes an opcode value that identifies whether the incoming data packet is a unicast packet, a multicast packet, a broadcast packet or resulted in a destination lookup failure.

4. A method as recited in claim 1, further comprising determining a class of service for the incoming data packet from said particular packet information and setting a priority for forwarding based on the class of service.

5. A network switch fabric forwarding data comprising:

means for reading a first packet portion of an incoming data packet containing a destination address;

means for determining an egress port bitmap based on the first packet portion;

means for forwarding the incoming data packet based on the egress port bitmap, when the destination address does not belong to a trunk group; and means for forwarding the incoming data packet thereto, when the destination address does belong to the trunk group.

6. A network switch fabric as recited in claim 5, further comprising means for determining the particular trunked port of the trunk group by calculating a hash value based on the destination address and means for selecting the particular trunked port based on the hash value.

7. A network switch fabric as recited in claim 5, wherein said particular packet information includes an opcode value that identifies whether the incoming data packet is a unicast packet, a multicast packet, a broadcast packet or resulted in a destination lookup failure.

8. A network switch fabric as recited in claim 5, further comprising means for determining a class of service for the incoming data packet from said particular packet information and means for setting a priority for forwarding based on the class of service.

9. A network switch fabric forwarding data comprising:

a reader, for reading a first packet portion of an incoming data packet containing a destination address;

a determiner, for determining an egress port bitmap based on the first packet portion;

a first forwarder, for forwarding the incoming data packet based on the egress port bitmap, when the destination address does not belong to a trunk group; and a second forwarder, for forwarding the incoming data packet thereto, when the destination address does belong to the trunk group.

10. A network switch fabric as recited in claim 9, further comprising means for determining the particular trunked port of the trunk group by calculating a hash value based on the destination address and means for selecting the particular trunked port based on the hash value.

11. A network switch fabric as recited in claim 9, wherein said particular packet information includes an opcode value that identifies whether the incoming data packet is a unicast packet, a multicast packet, a broadcast packet or resulted in a destination lookup failure.

12. A network switch fabric as recited in claim 9, further comprising a class of service determiner for determining a class of service for the incoming data packet from said particular packet information and a priority setter for setting a priority for forwarding based on the class of service.

* * * * *